BEST AVAILABLE COPY
2. Sheets. Sheet. 1.
J. Sangster,
Brick Machine.
No. 4178. Reissued Nov. 15. 1870.
Fig. I.
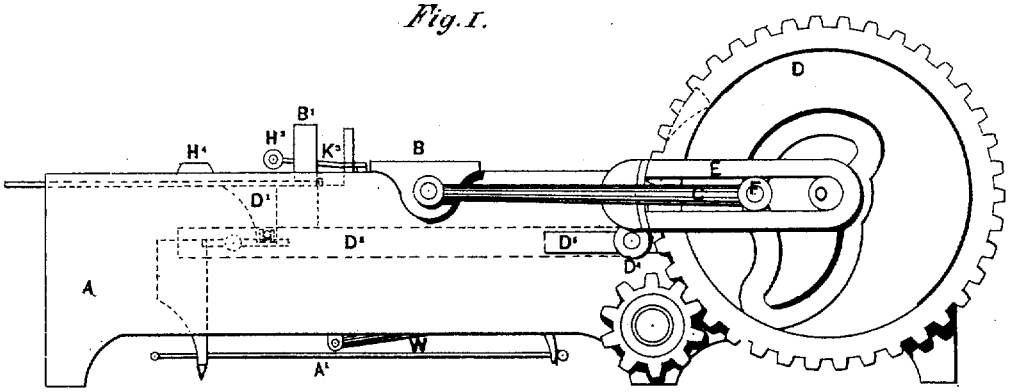
Fig. IV.
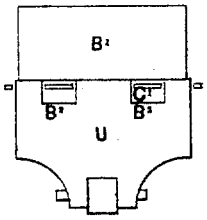
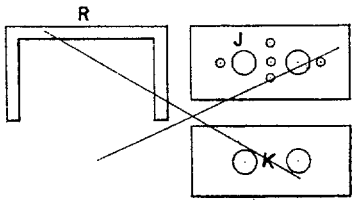
5125
Edward Wilhelm
Jno. J. Bonner } Witnesses
James Sangster Inventor
2P.-ON
N. PETERS, PHOTO-LITHOGRAPHER, WASHINGTON, D. C.

BRICK & EARTHENWARE APPARAT
Block Presses,
56 Reciprocating Mold, Plunger,
In Line of Mold Travel.
2. Sheets. Sheet. 2.
J. Sangster,
Brick-Machine.
No. 4,178. Reissued Nov. 15. 1870.
Fig. II.
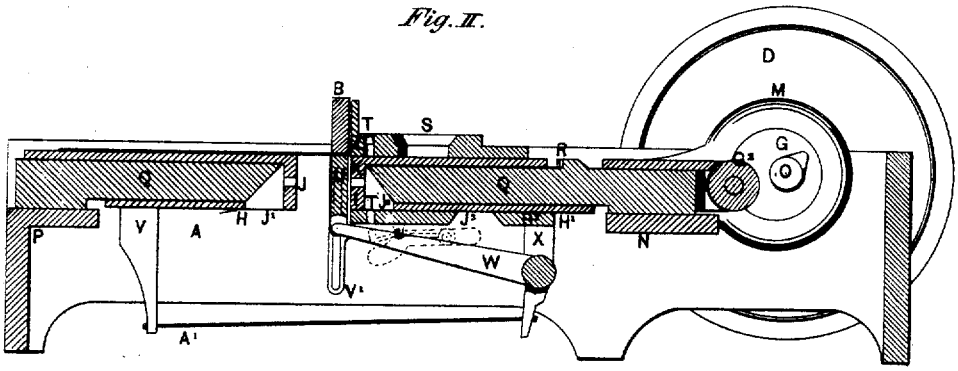
Fig. III.
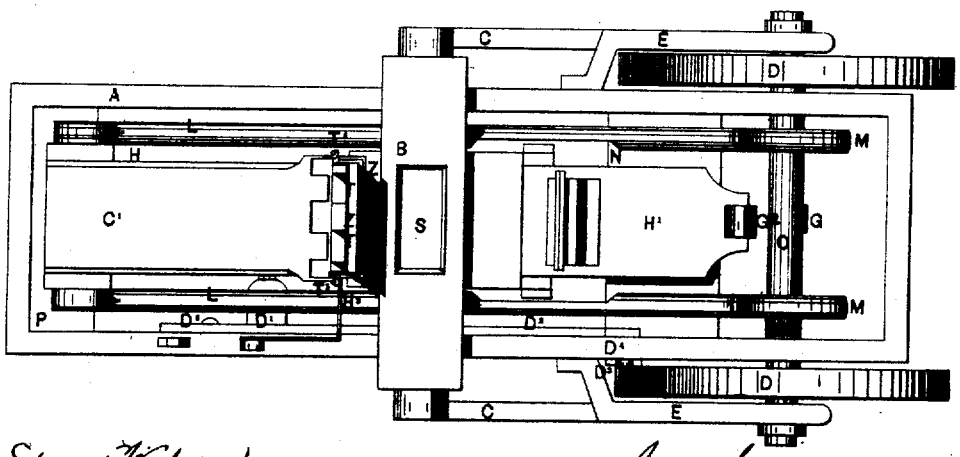
Edward Wilhelm
Jno. J. Bonner } Witnesses
James Sangster Inventor
N. PETERS, PHOTO-LITHOGRAPHER, WASHINGTON, D. C.

United States Patent Office.

JAMES SANGSTER, OF BUFFALO, NEW YORK.

Letters Patent No. 59,080, dated October 23, 1866; reissue No. 4,178, dated November 15, 1870.

DIVISION A.

IMPROVEMENT IN BRICK-MACHINES.

The Schedule referred to in these Letters Patent and making part of the same.

*To all whom it may concern:*

Be it known that I, JAMES SANGSTER, of Buffalo, in the county of Erie, in the State of New York, have invented certain new and useful Improvements in and on Machines for Making Brick; and I do hereby declare that the following is a full and exact description thereof, reference being had to the accompanying drawing, in which—

Figure I is a side elevation, showing the cam for giving the necessary movements to the mold; also part of the machinery for lifting and delivering the brick;

Figure II is a vertical longitudinal section, showing the position of the several parts at the moment the brick is lifted from the mold;

Figure III is a plan view of the machine complete;

Figure IV is a front view of the lifter, showing its form, and an end view of the mechanism for taking the brick from it after being lifted from the mold;

Figure V is a view of one of the thin bars or plates for regulating the distance between the two pistons; and Figure VI represents the faces of the two pistons.

Like letters in the several figures designate similar parts in each.

In the molding of brick and tiles, &c., from damp clay or other material, the great desideratum is not only to provide the most perfect means for expelling the air during the action of pressing or forming the brick into shape, but to provide at the same time the means for pressing it into such a condition that the heat, during the process of baking, can reach and be diffused through the central parts of the same, and thereby cause the particles to contract equally throughout, or nearly so, for the purpose of preventing the checking or cracking of the brick.

The nature of my invention consists in—

First, perforating the upper and lower parts, and the sides of the mold B, and perforating any of said parts or sides of the said mold, when the holes made by such perforations are confined to the part or parts, where the brick or material is when receiving its pressure.

Second, in the arrangement of bolts or pins, which move at the proper time for the purpose of moving back into the mold from said apertures the surplus clay which had been forced into them while the brick was being formed or pressed.

Third, in so combining and arranging the mechanism for moving the pistons for pressing the brick into shape, that one piston moves first and presses the clay confined between them into as small a compass as may be desired, after which its action ceases, or nearly ceases, until the opposite piston moves forward, and by forcing the first piston, together with the brick partly compressed, against a solid support or backing, completes the pressure and finishes the brick ready to be moved from the mold and delivered.

Fourth, in a device for regulating the distance between the two pistons while giving the pressure to the brick, or for compensating for the wearing of the machinery, the same consisting of thin plates of metal or other material, which are placed between the back end of one of the pistons and its backing or support, as many of said plates being used as may be necessary to adjust it to the point desired.

Fifth, in the openings $J^1$ and $J^2$ in the lower parts, or in the sides of the pistons for the purpose of leaving a means for the escape of the surplus clay or other material, which may be forced through certain apertures in the faces J and K of said pistons during the operation of pressing the brick.

Sixth, in the opening $J^3$ in the lower part or sides of the mold, for the escape of the surplus clay or other material, which may drop or be forced through opening $J^2$ in the piston over which it is moved.

Seventh, in the combination and arrangement of a cam, movable connecting-rod, stationary guides, and two friction-rollers, or the equivalent thereof, one of which moves in the cam, while the other, or the equivalent thereof, moves between said guides, causing said connecting-rod to move easily in a straight line back and forth, while the cam is giving it the necessary reciprocating motions for moving the mold of a brick-machine.

Eighth, in the combination of the pistons H and H′, when so arranged that the piston which gives the greatest pressure to the brick presents the greatest number of holes, or more open space for the escape of the surplus clay or other material, than the piston which gives the least pressure, for the purpose of compensating for the increased pressure of said piston, and making the density of the brick as near the same on both sides as possible, to prevent warping in baking.

A is the frame of the machine.

B, the sliding mold.

It is moved by the cam D on the shaft O.

C is the connecting-rod. It connects at one end with the mold, and at the other with the cam, as shown.

E is a stationary guide, between which part of said connecting-rod is moved.

F is a small wheel on said connecting-rod. It moves with it between the guides, and serves to steady it, and lessen the friction of said rod while moving between them.

S is the opening in the mold to receive the clay.

Said mold B surrounds the pistons entirely, and moves along them during the action of the machine.

H and H′ represent the pressing-pistons, the faces of which are shown in Fig. VI, and the openings are marked J and K. A greater number of holes, or more of an opening is left for the escape of surplus material in one than in the other; the piston which is destined to give the greatest pressure to the brick containing the most, or as much more as is necessary to compensate for the increase of pressure.

Said pistons nearly surround and move on the stationary guides Q Q, said guides being fastened firmly to the cross-pieces N and P, by means of bolts, or the equivalent of the same.

The piston H is operated by eccentrics M on the main shaft, through the intervention of the connecting-rods L, and the piston H′ is operated by the cam G, also on the main shaft, acting on the friction-roller $G^2$, attached to one end of said piston.

The angular position of the eccentrics M and cam G on the shaft O is such as to cause the pistons to alternately approach to and recede from each other, while the relative position and shape of the cams D is such as to cause the mold-box B to move forward and bring its aperture S over the space between the pistons, when they are at their greatest distance apart, or shortly after the piston H begins its return movement.

When the parts are in this position, the clay is introduced into the mold-box through the aperture S, and it then begins its return movement, moving faster than the piston H, which is also returning.

This return movement of the mold-box is continued until the space between the pistons is inclosed upon all sides, after which it remains stationary while the cam G moves the piston H′ toward the piston H, which movement is continued until the clay nearest the piston H′ is sufficiently condensed, or nearly so.

The cam G will have then passed the roller $G^2$, so that the piston H, which is still making its return movement will force back the piston H′ until it strikes the fixed stop R, when the piston H will condense the clay upon its side to the same degree as that upon the side of the piston H′, and thus complete the pressing of the brick in the mold.

The piston H will now begin its forward movement and relieve the pressure upon the brick, and at the same time the mold-box will resume its return movement, causing the piston H′, which is now stationary, to expel the brick from the mold-box. The mold-box will now remain stationary a short time until the piston H completes its forward movement, when it will be again carried forward to the position first described.

This completes one evolution of the machine, so far as the pressing of the brick is concerned, and will, of course, be repeated at each revolution of the main shaft.

The lifter for the brick is represented by letter U.

The upper part is formed with one or more spaces or openings, such as shown at $B^2 B^2$ in Fig. IV. These openings are left for the purpose of admitting the movement of the projecting parts of the plate C′ between them and under the brick, so that said lifter can descend and leave the brick standing upon said plate C′, as clearly shown by Fig. IV.

W is a lever, moving for the lifter. It moves upon a joint on the piece X, which is fastened to the mold B.

V is an arm, which is fastened to the piston H, and moves with it.

The rod A′ slips through a hole in the lower part of said arm; also through an opening in the lower part of the lever W.

As will be readily seen, the movement of the piston H away from the brick, after being pressed, causes the lifter to be raised up, and the brick B′ with it, and that the movement of the mold B forward in the same direction will cause it to drop down again, and leave the brick on the plate C′.

Plate C′ receives its motion from the bar $D^2$, arm $D^1$, friction-roller $D^4$, and a wedged-shaped cam on the cam-wheel D, which is shown by dotted lines $D^3$ in Fig. I.

It also receives part of its motion by the movement of the mold, as it is connected partially to said mold by pins, which allow it to be moved about the width of a brick or a little more, by the wedge-cam $D^3$, which moves against the friction-roller $D^4$.

The bar $D^2$ is held to the side of the machine by a bolt, which passes through a slot in said bar at one end.

The opposite end passes through a slot, $D^5$, in the side of the machine.

The pins for throwing the surplus clay back into the mold receive their motion from the wheel $H^2$ and projecting piece or cam $H^4$, by means of the arm or lever, which is jointed to the front part of the mold at $H^3$, or the equivalent thereof.

When it is desired to have pins for the apertures in the lower part or sides of the mold, they may be moved in a similar manner, as shown by the dotted lines in Fig. I.

The wheel $H^2$ receives its motion from the reciprocating movement of the mold.

T T represent said openings in the mold B.

By means of my invention, I claim that the brick is pressed so as to afford a means for the more equal contraction of the clay or other material during the process of baking, and producing a more perfect brick than any process now in use.

I do not confine myself to any particular position of the brick while being pressed, as it may be pressed from the ends, the sides, or from the top and bottom.

I do not claim, broadly, perforating the bottom of mold B, nor the ends of the pistons; but What I do claim as my invention, and desire to secure by Letters Patent, is—

1. The openings T T, be the number more or less, when placed within the portion of the sliding mold B, where the brick or material receives its pressure.

2. The opening $J^3$ in the bottom of the mold B, for the purpose of leaving room for the escape of the surplus clay or material, as described.

3. The openings $J^1$ and $J^2$ in the lower part or sides of the pistons, as and for the purposes described.

4. The pins Z Z, or the equivalent thereof, in the mold B, substantially as described.

5. A piston, moving and compressing the clay to the point desired, which is there forced by the opposite piston, with the brick partly compressed, back again to a support, where it remains until the piston which moves it back gives the completing pressure to the brick.

6. The employment of one or more plates R, substantially as described.

7. The arrangement of the cam, connecting-rod, and the stationary guide E, as described, when used to give the irregular reciprocating motions to the mold of a brick-machine.

8. The combination of the pistons H and $H^1$, as described and set forth.

JAMES SANGSTER.

Witnesses:
EDWARD WILHELM,
JNO. J. BONNER.